Figure 1:
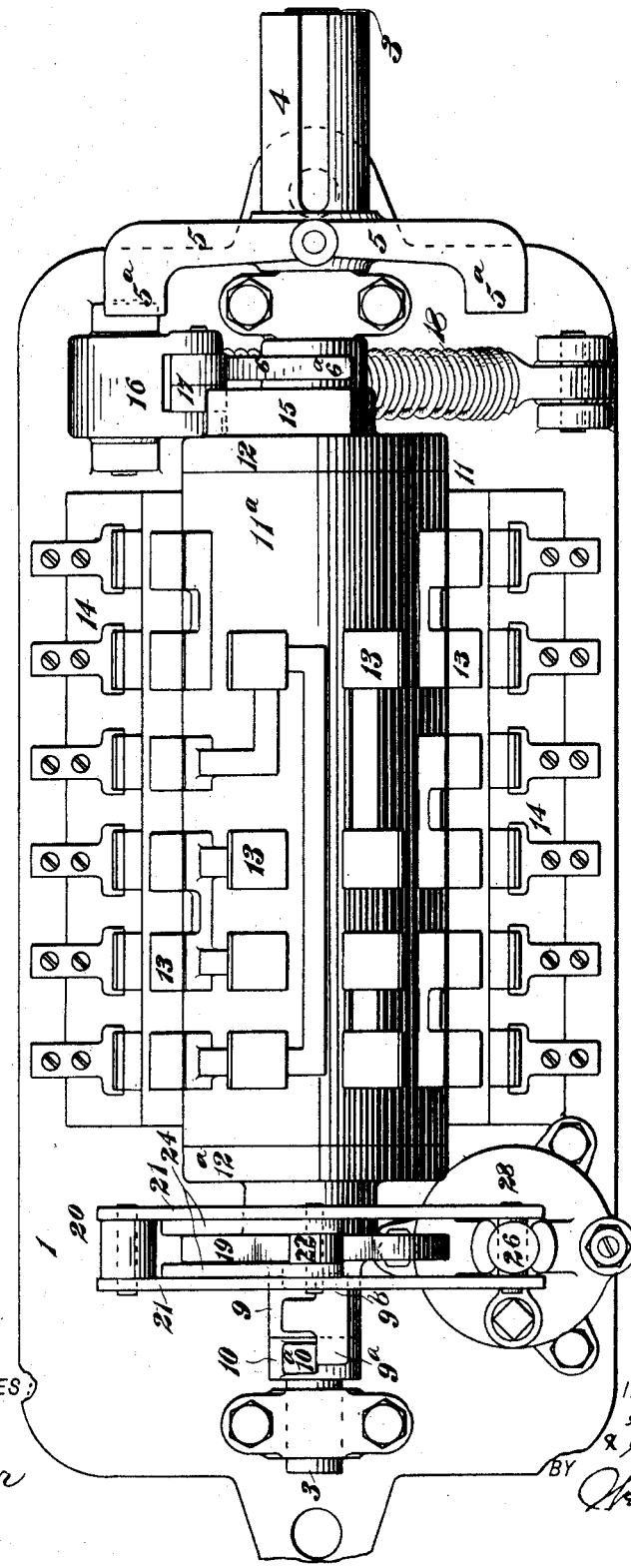

No. 629,665. Patented July 25, 1899.
H. P. DAVIS & G. WRIGHT.
CONTROLLER FOR ELECTRIC MOTORS.
(Application filed Mar. 24, 1899.)

(No Model.) 5 Sheets—Sheet 1.

WITNESSES:
INVENTORS
Harry P. Davis
& Gilbert Wright
BY
ATTORNEY.

No. 629,665. Patented July 25, 1899.
H. P. DAVIS & G. WRIGHT.
CONTROLLER FOR ELECTRIC MOTORS.
(Application filed Mar. 24, 1899.)
(No Model.) 5 Sheets—Sheet 2.
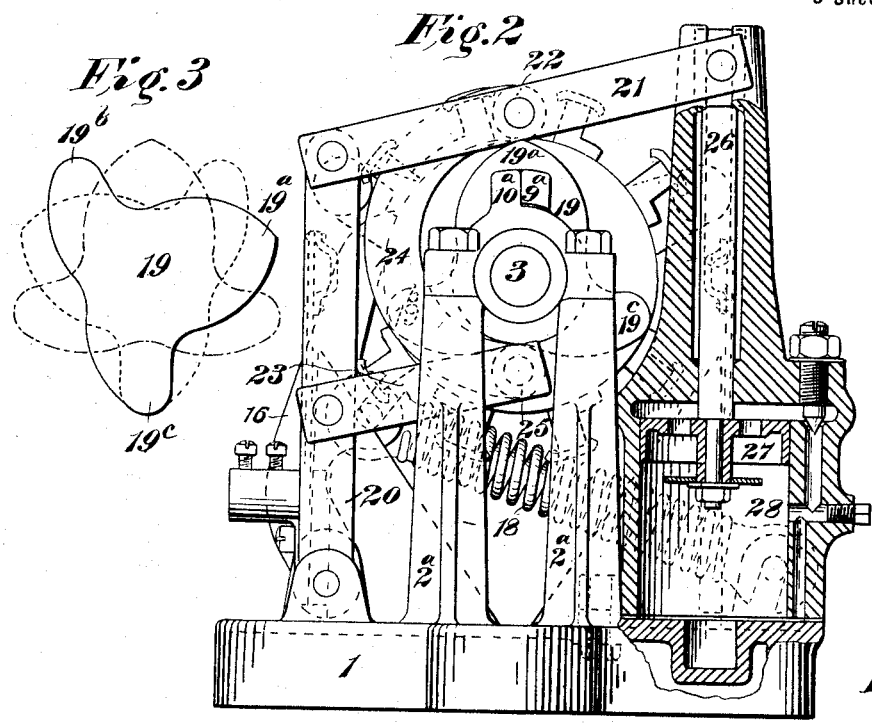
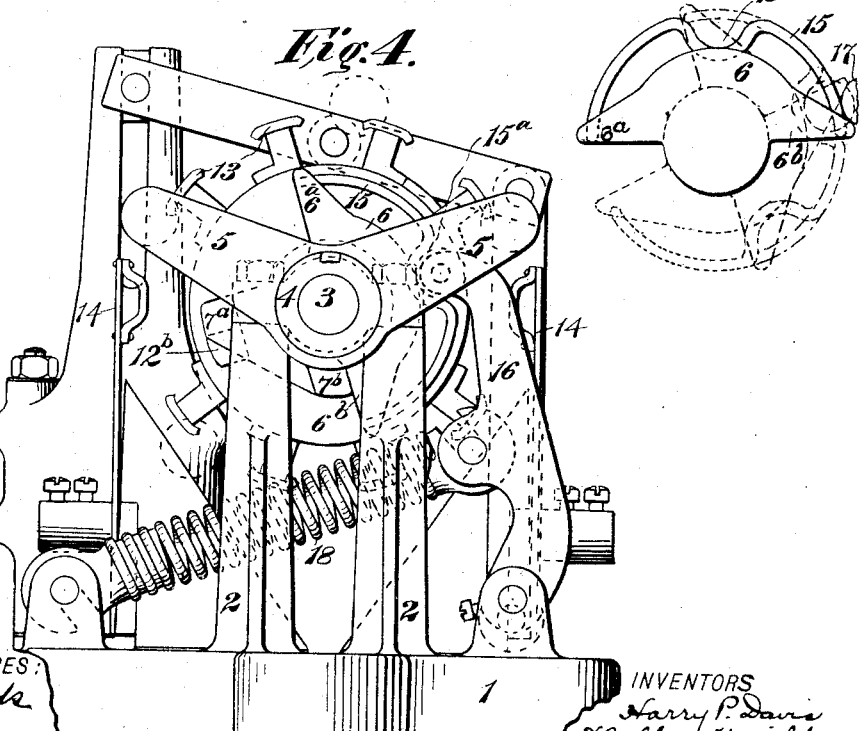
WITNESSES: INVENTORS
Ethan D. Dodds Harry P. Davis
H. C. Fener Gilbert Wright
BY
Wesley G. Carr
ATTORNEY.

No. 629,665. Patented July 25, 1899.
H. P. DAVIS & G. WRIGHT.
CONTROLLER FOR ELECTRIC MOTORS.
(Application filed Mar. 24, 1899.)

(No Model.) 5 Sheets—Sheet 3.

No. 629,665. Patented July 25, 1899.
H. P. DAVIS & G. WRIGHT.
CONTROLLER FOR ELECTRIC MOTORS.
(Application filed Mar. 24, 1899.)
(No Model.) 5 Sheets—Sheet 4.
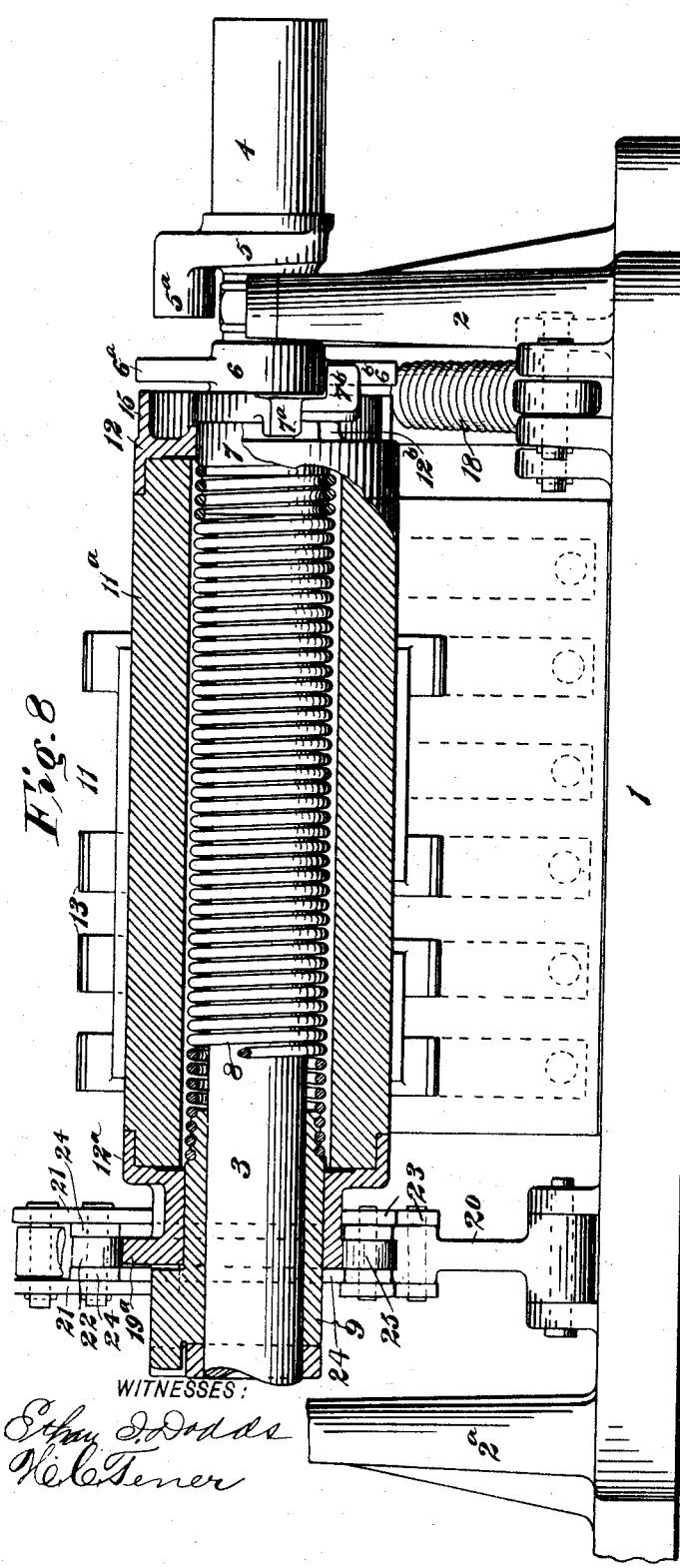
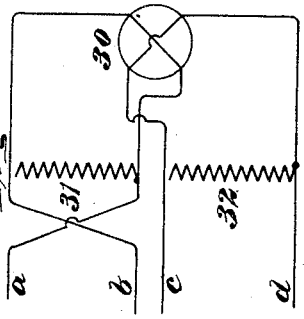
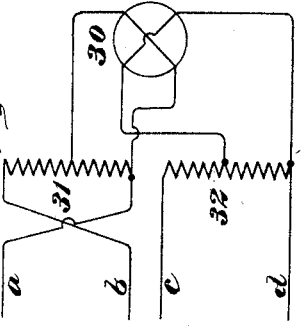
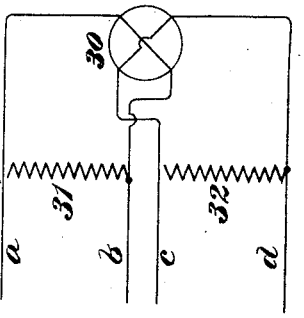
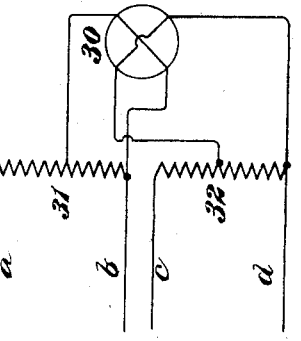
WITNESSES:
INVENTORS
Harry P. Davis
+ Gilbert Wright
BY
Wesley G. Carr
ATTORNEY.

No. 629,665. Patented July 25, 1899.
H. P. DAVIS & G. WRIGHT.
CONTROLLER FOR ELECTRIC MOTORS.
(Application filed Mar. 24, 1899.)
(No Model.) 5 Sheets—Sheet 5.
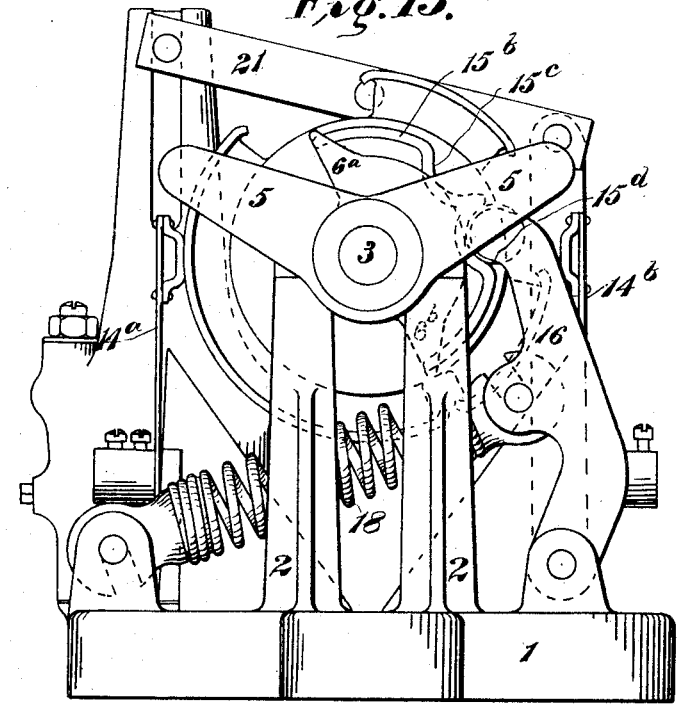
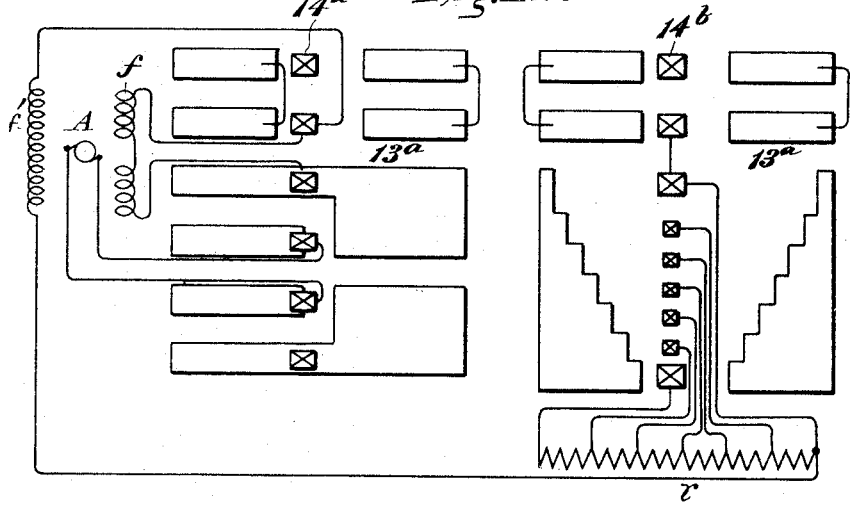
WITNESSES:
INVENTORS
Harry P. Davis
& Gilbert Wright
BY
Wesley G. Carr
ATTORNEY.

UNITED STATES PATENT OFFICE.

HARRY P. DAVIS, OF PITTSBURG, AND GILBERT WRIGHT, OF WILKINSBURG, PENNSYLVANIA, ASSIGNORS TO THE WESTINGHOUSE ELECTRIC AND MANUFACTURING COMPANY, OF PENNSYLVANIA.

CONTROLLER FOR ELECTRIC MOTORS.

SPECIFICATION forming part of Letters Patent No. 629,665, dated July 25, 1899.

Application filed March 24, 1899. Serial No. 710,284. (No model.)

*To all whom it may concern:*

Be it known that we, HARRY P. DAVIS, residing at Pittsburg, and GILBERT WRIGHT, residing at Wilkinsburg, in the county of Allegheny and State of Pennsylvania, citizens of the United States, have invented a new and useful Improvement in Controllers for Electric Motors, (Case No. 818,) of which the following is a specification.

Our invention relates to apparatus employed for controlling the speed and direction of rotation of the movable members of electric motors; and it has for its object to provide a device which shall perform its functions in a certain and efficient manner and at a predetermined degree of rapidity that is independent of the character of the actuating impulse imparted by the operator.

Our invention is especially designed for the control of motors employed for operating elevators, and though not limited to such use it will for convenience be described more particularly with reference to its operation in such relations. It is generally understood that elevators should be brought from a state of rest to maximum speed gradually in order to avoid injury to the supporting and actuating mechanism and also, in the case of passenger-elevators, in order to avoid discomfort to the passengers.

It is obviously desirable to make the speed acceleration independent of the operator so far as is feasible in order that possible unskilfulness or carelessness may be eliminated as a factor in the operation.

When a single direct-current motor is employed for operating an elevator, the speed is usually varied by varying the amount of external resistance in the motor-circuit, and where an alternating-current motor is employed the electromotive force is varied by means of an adjustable transformer of some sort. In either case it has been the usual practice prior to our present invention to employ a starting, stopping, and reversing switch and a separate speed-varying switch, provided the latter operated independently of the attendant.

Our present invention comprises a single piece of controlling mechanism which is manually operated to start, stop, and reverse the motor, but which acts automatically to increase the speed of the motor.

Figure 6:
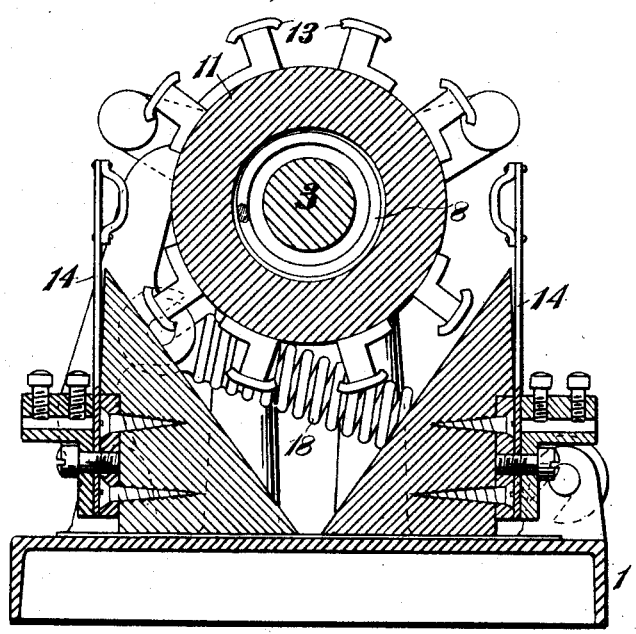
Figure 7:
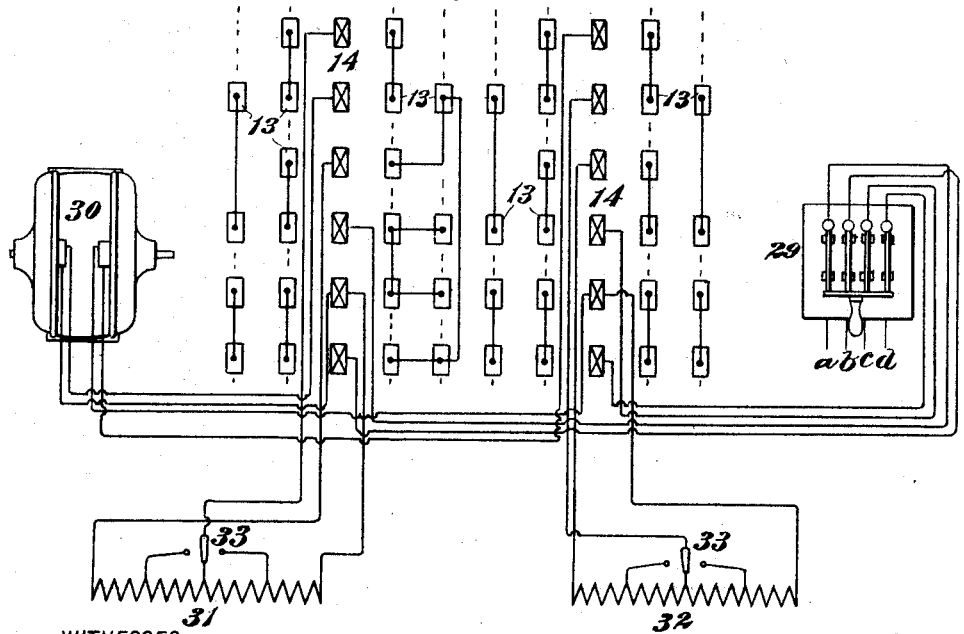

In the accompanying drawings, Figure 1 is a plan view of one form of our controller, the conductors leading to and from the motor and the pulley or hand-wheel for operating the controller being omitted. Fig. 2 is a view of the controller, partially in end elevation and partially in section. Fig. 3 is a detail view of the cam shown in Fig. 2. Fig. 4 is an elevation of the end opposite to that shown in Fig. 2. Fig. 5 is a detail view of a portion of the mechanism shown in Fig. 4. Fig. 6 is a transverse sectional view of the controller. Fig. 7 is a diagram of the motor, the controller-circuits, and a circuit opening and closing switch. Fig. 8 is a view of the controller, partially in side elevation and partially in longitudinal section. Figs. 9, 10, 11, and 12 are diagrams of the electric circuits corresponding to the four running positions of the motor. Fig. 13 is an end view of a modified form of controller adapted for a direct-current motor, and Fig. 14 is a diagram of motor and controller circuits adapted for direct currents.

Referring now to Figs. 1 to 12 of the drawings, the supporting-base 1 of the controller is provided at its respective ends with standards 2 and $2^a$, upon which is mounted a shaft 3, so as to be capable of partial rotation by means of a pulley, hand-wheel, or other device (not shown) keyed to a sleeve 4, that surrounds and is rigidly fastened to the end of the shaft that projects beyond the standards 2. Two laterally-projecting arms 5 are rigidly fastened to the sleeve 4 or constitute integral parts of the same. Each arm 5 has an inturned end $5^a$, so located as to engage the adjacent standard 2 when the shaft is rotated in the proper direction. Keyed or otherwise rigidly fastened upon the shaft 3, adjacent to the standards 2, is a cam 6, having two oppositely-projecting arms $6^a$ and $6^b$. Loosely mounted upon shaft 3, adjacent to cam 6, is a sleeve 7, to which is fastened one end of a helical spring 8, the latter being coiled about the shaft, as is clearly shown in Fig. 8. The sleeve 7 is provided with a lug $7^a$; that projects laterally toward standards 2ª, and with a lug 7ᵇ, that projects laterally in the opposite direction into the path of movement of the arm 6ᵇ of the cam 6. The end of helical spring 8 opposite to that which is fastened to sleeve 7 is rigidly fastened to a sleeve 9, also loose upon the shaft 3. This sleeve 9 is also provided with two oppositely-projecting lugs 9ª and 9ᵇ. A collar 10 is keyed or otherwise rigidly fastened to the shaft between the standards 2ª and the sleeve 9 and is provided with a lug 10ª, in position to engage the lug 9ª when the shaft is rotated in the proper direction for such engagement. Journaled upon the two sleeves 7 and 9 is a drum 11, having metal ends 12 and 12ª and an intermediate body of non-conducting material 11ª, this body being provided with the strips or blocks 13 of conducting material, which are suitably arranged and connected, as will be hereinafter more fully described, in order to effect the circuit changes necessary for proper control of the motor. Mounted upon the base in position to engage these drum contact-pieces 13 as the drum is rotated are contact-fingers 14, which constitute the stationary terminals for the electric circuits, there being six of these contact-fingers on each side of the drum in the form shown.

The metal end 12 of the drum 11 is provided with a lug 12ᵇ, located in the path of movement of the lug 7ª on sleeve 7, and with a flange 15, the major portion of which is in the arc of a circle which is concentric with the surface of the drum, but which at its middle point is recessed to form a notch 15ª. A holding-pawl 16 is pivoted at one end to the base and is provided at its other end with a roller 17 of such dimensions and so located as to bear upon the cam 6 and the rim 15 and to fit into the recess 15ª in the latter when the drum is in proper position for such engagement. This holding-pawl 16 is drawn inward toward the drum by means of a coiled spring 18, one end of which is fastened to the pawl intermediate its ends, the other end being fastened to a suitable projection on the base 1. The end 12ª of the drum is provided with a cam 19, having three projecting portions 19ª, 19ᵇ, and 19ᶜ of such form as to give the cam somewhat the shape of a clover-leaf.

At one side of the base 1 and in transverse alinement with the cam 19 an arm 20 is pivotally mounted. The upper end of this arm is pivotally connected to a pair of arms 21, between which is journaled a roller 22 in such position as to rest upon the cam 19. A pair of shorter arms 23, parallel to the arms 21, are connected to the latter by curved links 24. The arms 23 are provided with a roller 25, which is in contact with the cam 19 at the side opposite to that which engages with the roller 22. Since the links 24 connect the pins on which the rollers 22 and 25 are mounted, a parallel motion of the arms 21 and the arms 23 obviously results when the cam is rotated.

The free ends of the arms 21 are pivoted to the stem 26 of a piston 27. This piston is located in a cylinder 28, which is filled or partially filled with glycerin or other suitable fluid to give the desired dash-pot effect.

The mechanical operation of the controller is as follows: Assuming that the controller is in its zero or "off" position and regarding it from the end shown in Fig. 4, if the shaft 3 be rotated by the operator in a clockwise direction the arm 6ᵇ will engage the lug 7ᵇ on the sleeve 7, and thus wind the spring 8 until the arm 6ª comes into engagement with the roller 17 on the holding-pawl 16 and moves it out of the locking-notch 15ª. When this action takes place, the drum 11 will turn quickly under the action of the spring and at a certain definite speed, determined by the strength of the spring, the construction and adjustment of the dash-pot mechanism, &c., a sufficient distance to bring the sets of contact-pieces 13, corresponding to the initial speed of the motors, into engagement with the contact-fingers 14. The further movement of the drum to bring the contact-pieces corresponding to maximum motor speed into engagement with the fingers will be effected slowly by the spring 8, the rate of movement being determined by the dash-pot mechanism and the cam-and-lever mechanism between the same and the drum. In returning to the zero position the drum is free to turn with the shaft, since the roller 17 moves freely over the cylindrical portion of the flange 15, and there is no retardation due to the dash-pot. If it now be desired to rotate the drum in the opposite direction to that above described—that is, in a contra-clockwise direction—in order to operate the motor in a reverse direction, the drum will be held stationary by the holding-pawl until the arm 6ᵇ comes into engagement with roller 17, when the spring 8 will serve to rotate the drum quickly to the first running position, the slow movement to the second position being effected by the means and in the manner already described. The winding of the spring when the shaft is rotated in the direction last described is effected by the engagement of the lug 10ª on the collar 10 with the adjacent lug 9ª on the sleeve 9.

The electrical circuits and circuit changes shown in Fig. 7 and in Figs. 9 to 12 are those which are employed when the controller is adapted and used for controlling the operation of an alternating-current induction-motor.

In the figures just referred to the circuits $ab$ and $cd$ are supplied from a two-phase generator of suitable construction, (not shown,) a switch 29 being employed for opening these circuits when desired. The motor 30 may also be of usual construction—that is, a two-phase induction-motor—and in order to run this motor in either direction and at different speed we employ two autotransformers 31 and 32, one for each circuit. In each case a hand-switch 33 is shown in order that one-fourth, one-half, or three-fourths of the primary voltage may be thrown upon the motor in the first position, the switch being shown in the drawings as connected at the middle point, so that one-half the primary voltage is thrown upon the motor in the first position of the controller. In the first position, corresponding to a clockwise movement of the controller-shaft from the zero position, one-half of the line-voltage is thrown upon the motor, the entire winding of each transformer being in the generator-circuit and one-half of such winding in the motor-circuit. (See Fig. 9.) In the second and final position of the drum when rotated in a clockwise direction from the zero point the autotransformers are cut out of circuit, and the full-line potential is therefore thrown upon the motor. (See Fig. 10.) The circuits in Fig. 11 correspond to the first running position when the drum is moved in a contra-clockwise direction, and in this case the circuits are the same as in Fig. 9, one-half the line-voltage being on the motor, except that one of the phases is reversed, thus reversing the direction of rotation of the motor-shaft. In Fig. 12 the circuits correspond to the second running position when the drum is moved in a contra-clockwise direction, one of the phases being reversed and both converter-windings being out of circuit, thus putting the entire line-voltage on the motor and securing maximum speed.

The operation of the drum by the wound-up spring serves, as will be readily seen, to throw the drum quickly into the first position when it is released by the removal of the roller 17 on the holding-pawl 16 from the notch 15$^a$; but the movement from the first to the second position cannot take place until the dash-pot cylinder has had time to move through the maximum portion of its stroke, thus enabling the motor to come up to half-speed before the full voltage is thrown upon it and making the control of the motor independent of the speed with which the operator moves the operating lever or rope.

In Figs. 13 and 14 we have illustrated such modifications of the apparatus already described as are desirable in order to adapt it for use in connection with direct-current motors. The operating and governing mechanisms are or may be the same as those already described, with the exception of the flange 15$^b$, corresponding to the flange 15 of Figs. 1 to 8. This flange 15$^b$ is provided with two notches 15$^c$ and 15$^d$ in order that the drum may be stopped at such a position as to avoid short-circuiting the motor-armature when thrown from either "on" position to the "off" position.

It will be understood from the development of the controller-drum (shown in Fig. 14) that the fingers 14$^a$ and 14$^b$ coöperate with the contact-strips 13$^a$ on the drum to progressively cut out the resistance $r$ as the drum is rotated in either direction from either off position, that the direction of the current-flow through the armature A is reversed by reversing the direction of rotation of the drum from the zero position, and that a closed circuit, including the armature A and field-magnet windings $f$ and $f'$, is maintained during the time that the line-current is cut off.

It is to be understood that the dash-pot and cam-and-lever mechanisms will be so adjusted as to insure the degree of initial movement and the rate of subsequent movement that are adapted to the number and arrangement of the drum-contacts and that the details of construction may be varied within comparatively wide limits without departing from our invention.

We claim as our invention—

1. In a controller for electric motors, the combination with stationary contact fingers or brushes, of a drum provided with suitably arranged and connected contact-pieces, a shaft upon which said drum is rotatably mounted, a spring for storing the energy imparted to the shaft, means for clamping either end of the spring to the shaft and the opposite end to the drum, according to the direction in which the shaft is rotated, a device for holding said drum stationary and means for withdrawing said holding device at a predetermined point in the rotation of the shaft.

2. In a controller for electric motors, the combination with a rotatable shaft and a contact-bearing drum sleeved thereon, of an actuating-spring for said shaft, means for holding the drum stationary while the spring is being set for operation, means for releasing the drum and means for regulating its speed of rotation.

3. In a controller for electric motors, the combination with contact-fingers and a drum having suitably arranged and interconnected contact-plates, of an actuating-shaft, a spring, means for holding the drum against rotation, means for clamping either end of the spring to the shaft and the opposite end to the drum according to the direction of rotation of the shaft, means for releasing the drum as the shaft reaches the limit of its movement and means for retarding the movement of the drum after it is released.

4. In a controller for electric motors, the combination with an actuating-shaft, a contact bearing drum and an intermediate spring, of interlocking sleeves and collars whereby the respective ends of the spring are locked to the shaft and to the drum, means for holding the drum against rotation until the shaft has reached a predetermined point in its movement and means for retarding the movement of the drum after it is released.

5. In a controller for electric motors, the combination with a manually-rotatable shaft, of a drum provided with suitably arranged and interconnected contact-pieces, stationary contact-fingers, an actuating-spring one end of which is temporarily locked to the shaft and the other to the drum, the direction of rotation determining which end is attached to the drum and which end to the shaft, means for holding the drum against rotation, means for releasing the drum at a predetermined point in the rotation of the shaft and means for regulating the movement of the drum after it is released.

6. In a controller for electric motors, the combination with a manually-operated shaft of two sleeves loosely mounted thereon, a helical spring surrounding said shaft and having its respective ends fastened to said sleeves and having projections for engaging projections on said sleeves, collars fast upon the shaft and having projections in position to engage projections on said sleeves, means for holding the drum against rotation, means for releasing it at a predetermined point in the movement of the shaft, and means for retarding the movement of the drum after it is released.

In testimony whereof we have hereunto subscribed our names this 20th day of March, 1899.

HARRY P. DAVIS.
GILBERT WRIGHT.

Witnesses:
WESLEY G. CARR,
H. C. TENER.